Patented June 15, 1948

2,443,374

UNITED STATES PATENT OFFICE 2,443,374

MANUFACTURE AND PRODUCTION OF LACQUERS AND PLASTIC MASSES

John George Mackay Bremner and David Gwyn Jones, Norton-on-Tees, and Stephen Frederick Pearce and Laurence Michael Smith, Welwyn Garden City, England, assignors to Imperial Chemical Industries Limited, a corporation of Great Britain No Drawing. Application September 21, 1944, Serial No. 555,200. In Great Britain September 29, 1943

7 Claims. (Cl. 260—30.4)

This invention relates to improvements in the manufacture and production of lacquers and plastic masses. In particular it relates to solutions used as basic substances for lacquers and other plastic masses and to new solvents used to form said solutions.

According to the present invention, solutions for use as basic substances for lacquers and other plastic masses are produced by a process which comprises dissolving organic film-forming substances in a liquid having the general formula

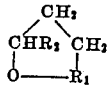

in which $R_1$ is either the radical $-CR_3=CH-$ or the radical $-CHR_3-CH_2-$ (where $R_3$ is selected from the group comprising methyl, ethyl, propyl, and isopropyl radicals and hydrogen, and is attached to the carbon atom directly linked to the oxygen atom), and $R_2$ is selected from the group comprising methyl, ethyl, propyl and isopropyl radicals and hydrogen. The most useful of these liquids are tetrahydropyrane and dihydropyrane.

Amongst the organic film-forming substances which are readily dissolved by liquids having the above general formula are polyvinyl chloride, chlorinated polyvinyl chloride, resins formed by condensing a phenol and formaldehyde, chlorinated rubber compounds, nitro-cellulose, ethyl cellulose polyvinyl esters of organic acids such as polyvinyl acetate, prolyvinyl acetals, polyacrylic and polymethacrylic acids and their esters and derivatives, natural resins such as shellac, rosin, copal and colophony, alkyd resins, waxes and drying oils. This invention is particularly useful for the production of solutions of polymers and interpolymers of vinyl chloride because these materials are only slightly soluble in other known solvents.

The liquids having the above general formula are colourless and unaffected by most of the substances used in the production of lacquers and plastic masses. Modifiers, dyes, pigments and plasticisers may be added to the solutions prepared according to the present invention in order to produce a variety of effects.

Our invention is illustrated but in no way limited by the following examples in which all parts given are by weight.

Example I 5 grams of polyvinyl chloride and 2.5 grams of tricresyl phosphate were added to 25 grams of tetrahydropyrane at 25° C. After stirring, a viscous mixture was formed which set to a gel upon cooling to 15° C. but became clear and mobile at 50° C.

This solution was sprayed at 50° C. on to a metal wire heated to 50° C. A thin, tough, coherent, closely adhering film was obtained.

Example II 10 grams of polymethyl methacrylate granules which contained 10% dibutyl phthalate and were prepared according to the process described in British Specification 427,494, were added to 50 grams of dihydropyrane at 20° C. After warming to 50° C. for 15 minutes complete solution was effected. The mixture became slightly viscous when cold.

The solution was painted with a brush on to a sheet of plywood and dried in an oven at 45° C. A tough transparent surface film which penetrated slightly the surface of the wood was produced.

Example III

A 16% solution of chlorinated polyvinyl chloride resin (containing 64% chlorine) in tetrahydropyrane was prepared at 50° C. and then cooled to room temperature. The solution was sprayed on to aeroplane fabric by means of a spray gun. A tough taut film was formed on the surface of the fabric.

Example IV 20 parts of chlorinated polyvinyl chloride resin (containing 64% chlorine) were dissolved in 80 parts of dihydropyrane. The solution was filtered at 50° C. and then used for the preparation of filaments of chlorinated polyvinyl chloride by the conventional dry-spinning process.

Example V 25 grams of an interpolymer of vinyl chloride and containing 12–15 parts vinyl actate molecular units and having a mean molecular weight of the order of 10,000 was dissolved with slight warming in 75 grams of tetrahydropyrane. A mobile solution was obtained, suited for use at normal temperatures to a wide variety of surface-coating applications.

Example VI 20 grams of shellac, sold under the trade description "Precipitated," was heated with 100 grams of tetrahydropyrane. Complete solution was effected in 30 minutes and on cooling a homogeneous mobile lacquer obtained.

Having now particularly described and ascertained the nature of said invention and in what manner the same is to be performed, we declare that what we claim is:

1. The production of solutions for use as basic substances for lacquers and other plastic masses by a process which comprises dissolving an organic film-forming substance selected from the group consisting of polyvinyl chloride, chlorinated polyvinyl chloride, polyvinyl esters of organic acids, interpolymers of vinyl chloride and vinyl esters of organic acids, polyvinyl acetals, polyacrylic acids, polymethacrylic acids, esters of polyacrylic acids, esters of polymethacrylic acids, phenol-formaldehyde resins, chlorinated rubber compounds, nitrocellulose, ethyl cellulose, natural resins and alkyd resins in a liquid having the general formula:

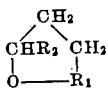

in which $R_1$ represents a radical selected from the group consisting of $-CR_3=CH-$ and $-CHR_3-CH_2-$ (where $R_3$ is selected from the group consisting of methyl, ethyl, propyl and isopropyl radicals and hydrogen and is attached to the carbon atom directly linked to the oxygen atom) and $R_2$ is selected from the group consisting of methyl, ethyl, propyl and isopropyl radicals and hydrogen.

2. The production of solutions according to claim 1 wherein the liquid is tetrahydropyrane.

3. The production of solutions according to claim 1 wherein the liquid is dihydropyrane.

4. The production of solutions according to claim 1, wherein the film-forming substance is a polymer of vinyl chloride.

5. A composition of matter comprising a solution of a polymer of vinyl chloride in dihydropyrane.

6. A composition of matter comprising a solution of a polymer of vinyl chloride in tetrahydropyrane.

7. A composition of matter comprising a solution of an organic film-forming substance selected from the group consisting of polyvinyl chloride, chlorinated polyvinyl chloride, polyvinyl esters of organic acids, interpolymers of vinyl chloride and vinyl esters of organic acids, polyvinyl acetals, polyacrylic acids, polymethacrylic acids, esters of polyacrylic acids, esters of polymethacrylic acids, phenol-formaldehyde resins, chlorinated rubber compounds, nitrocellulose, ethyl cellulose, natural resins and alkyd resins in a liquid having the general formula:

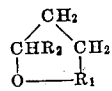

in which $R_1$ represents a radical selected from the group consisting of $-CR_3=CH-$ and $-CHR_3-CH_2-$ (where $R_3$ is selected from the group consisting of methyl, ethyl, propyl and isopropyl radicals and hydrogen and is attached to the carbon atom directly linked to the oxygen atom) and $R_2$ is selected from the group consisting of methyl, ethyl, propyl and isopropyl radicals and hydrogen.

JOHN GEORGE MACKAY BREMNER.
DAVID GWYN JONES.
STEPHEN FREDERICK PEARCE.
LAURENCE MICHAEL SMITH.

REFERENCES CITED

The following references are of record in the file of this patent:

UNITED STATES PATENTS

| Number | Name | Date |
|---|---|---|
| 2,368,186 | Wickert | Jan. 30, 1945 |